United States Patent
Gardner et al.

(10) Patent No.: US 9,083,669 B2
(45) Date of Patent: *Jul. 14, 2015

(54) SYSTEM AND METHOD FOR PROVIDING PLURALITY OF PRIORITIZED EMAIL DOMAIN NAMES

(75) Inventors: Darren Gardner, Bellevue, WA (US); David Jaray Hanson, Bellevue, WA (US); Rupak Sanjel, Bellevue, WA (US)

(73) Assignee: BlackBerry Limited, Waterloo (CA)

( * ) Notice: Subject to any disclaimer, the term of this patent is extended or adjusted under 35 U.S.C. 154(b) by 336 days.

This patent is subject to a terminal disclaimer.

(21) Appl. No.: 13/635,158

(22) PCT Filed: Jul. 1, 2011

(86) PCT No.: PCT/US2011/042779
§ 371 (c)(1),
(2), (4) Date: Sep. 14, 2012

(87) PCT Pub. No.: WO2012/033563
PCT Pub. Date: Mar. 15, 2012

(65) Prior Publication Data
US 2013/0007177 A1    Jan. 3, 2013

Related U.S. Application Data

(60) Provisional application No. 61/381,733, filed on Sep. 10, 2010.

(51) Int. Cl.
*G06F 15/16* (2006.01)
*H04L 12/58* (2006.01)
*H04L 29/12* (2006.01)

(52) U.S. Cl.
CPC ............ *H04L 51/26* (2013.01); *H04L 51/28* (2013.01); *H04L 29/12066* (2013.01); *H04L 29/12726* (2013.01); *H04L 61/1511* (2013.01); *H04L 61/307* (2013.01)

(58) Field of Classification Search
USPC ......................... 709/207, 206, 217
See application file for complete search history.

(56) References Cited

U.S. PATENT DOCUMENTS 5,968,117 A    10/1999  Schuetze
6,249,807 B1   6/2001  Shaw et al.
(Continued)

FOREIGN PATENT DOCUMENTS

GB    2382164    5/2003
WO    98/32273   7/1998
(Continued)

OTHER PUBLICATIONS

Klensin, "Simple Mail Transfer Protocol," http://tools.ief.org/html/rfc2821, Apr. 2001, pp. 1-78.
(Continued)

*Primary Examiner* — Karen Tang
(74) *Attorney, Agent, or Firm* — Steven M. Greenberg, Esq.; Donna Flores, Esq.; CRGO LAW

(57) ABSTRACT

The system and method are for provisioning an electronic mail (email) account for allowing access to an electronic mailbox to retrieve email. A mobile office platform includes a configuration module and a communications module which are operative for accessing an electronic mailbox. The communications module is to receive email address parameters of the user and transmit a domain name system (DNS) query to the Internet for returning mail exchange (MX) records, including email domain names, corresponding to the email address parameters of the user. The configuration module is to process returned MX records to determine candidate configuration parameters for accessing the email account of the user to retrieve user email. The configuration module is to determine candidate configuration parameters based upon expanding a plurality of prioritized email domain names of the returned MX records.

15 Claims, 9 Drawing Sheets

(56) References Cited

U.S. PATENT DOCUMENTS

| | | |
|---|---|---|
| 6,272,532 B1 | 8/2001 | Feinleib |
| 6,282,565 B1 | 8/2001 | Shaw et al. |
| 6,393,464 B1 | 5/2002 | Dieterman |
| 6,434,600 B2 | 8/2002 | Waite et al. |
| 6,446,114 B1 | 9/2002 | Bulfer et al. |
| 6,549,937 B1 | 4/2003 | Auerbach et al. |
| 6,594,706 B1 | 7/2003 | DeCoursey et al. |
| 6,654,787 B1 | 11/2003 | Aronson et al. |
| 6,728,759 B1 | 4/2004 | Na |
| 6,779,019 B1 | 8/2004 | Mousseau et al. |
| 6,832,244 B1 | 12/2004 | Raghunandan |
| 6,865,594 B1 | 3/2005 | Belissent et al. |
| 6,865,671 B1 | 3/2005 | Assmann |
| 7,962,558 B2 | 6/2011 | Nelson et al. |
| 8,078,681 B2 | 12/2011 | Gardner et al. |
| 8,117,267 B2 | 2/2012 | Gardner et al. |
| 8,626,857 B2 | 1/2014 | Gardner et al. |
| 2001/0032245 A1* | 10/2001 | Fodor ............................ 709/206 |
| 2002/0004826 A1 | 1/2002 | Waite et al. |
| 2002/0078158 A1 | 6/2002 | Brown et al. |
| 2002/0112007 A1 | 8/2002 | Wood et al. |
| 2002/0120697 A1 | 8/2002 | Generous et al. |
| 2002/0174194 A1 | 11/2002 | Mooney et al. |
| 2003/0074408 A1 | 4/2003 | Clark et al. |
| 2003/0084107 A1 | 5/2003 | Covey |
| 2003/0115270 A1 | 6/2003 | Funk et al. |
| 2003/0200267 A1 | 10/2003 | Garrigues |
| 2004/0054719 A1 | 3/2004 | Daigle et al. |
| 2004/0058673 A1* | 3/2004 | Irlam et al. .................. 455/412.1 |
| 2004/0260922 A1 | 12/2004 | Goodman et al. |
| 2004/0267907 A1 | 12/2004 | Gustafsson |
| 2005/0038857 A1 | 2/2005 | Gardner et al. |
| 2005/0038859 A1 | 2/2005 | Gardner et al. |
| 2005/0160335 A1 | 7/2005 | Peterson |
| 2006/0088026 A1 | 4/2006 | Mazur et al. |
| 2006/0212522 A1 | 9/2006 | Walter et al. |
| 2007/0073818 A1* | 3/2007 | Gardner et al. ............... 709/206 |
| 2007/0073819 A1* | 3/2007 | Gardner et al. ............... 709/206 |
| 2008/0109448 A1* | 5/2008 | Aboel-Nil et al. .............. 707/10 |
| 2008/0256204 A1* | 10/2008 | Kamat et al. .................. 709/206 |
| 2010/0034088 A1* | 2/2010 | Sakata et al. .................. 370/235 |
| 2012/0059895 A1* | 3/2012 | Gardner et al. ............... 709/206 |
| 2012/0117631 A1* | 5/2012 | Gardner et al. .................... 726/5 |
| 2013/0148797 A1* | 6/2013 | Toscano et al. .......... 379/100.08 |

FOREIGN PATENT DOCUMENTS

| | | |
|---|---|---|
| WO | 00/22543 | 4/2000 |
| WO | 2007040526 A1 | 4/2007 |
| WO | 2007043993 A1 | 4/2007 |

OTHER PUBLICATIONS

Partridge, "Mail Routing and the Domain System," CSNET CIC BBN Laboratories, Inc., Jan. 1986, pp. 1-8.

* cited by examiner

SYSTEM AND METHOD FOR PROVIDING PLURALITY OF PRIORITIZED EMAIL DOMAIN NAMES

TECHNICAL FIELD

The present disclosure relates to the field of communications systems, and, more particularly, to electronic mail (email) communications systems and related methods.

BACKGROUND

Electronic mail (email) has become an integral part of business and personal communications. As such, many users have multiple email accounts for work and home use. Moreover, with the increased availability of mobile cellular and wireless local area network (LAN) devices that can send and receive emails, many users wirelessly access emails from mailboxes stored on different email storage servers (e.g., corporate email storage server, Yahoo, Hotmail, AOL, etc.).

Yet, email distribution and synchronization across multiple mailboxes and over wireless networks can be quite challenging, particularly when this is done on a large scale for numerous users. For example, different email accounts may be configured differently and with non-uniform access criteria. Moreover, as emails are received at the wireless communications device, copies of the emails may still be present in the original mailboxes, which can make it difficult for users to keep their email organized.

The foregoing system usefully provides great convenience to users of wireless email communication devices for organizing and managing their email messages. Yet, further convenience and efficiency features may be desired in email distribution and synchronization systems as email usage continues to grow in popularity. For example, in new user accounts, an email provisioning and authentication system can run through a series of possible email server configurations to determine how to access an electronic mailbox for a user email account. The user can supply email address parameters such as an email address and password, but often becomes frustrated if the wrong email address parameter is typed. The user typically must wait a relatively long time to determine if something is wrong, or worse, the user may be given an advanced configuration screen and asked to provide difficult to know IP address numbers, ports and other entries because of the mistake. Some prior art systems have parsed emails and tried to provision, and as a subsequent step after failure, used MX records to aid in the process for accessing email.

In prior approaches, a system may run through a series of possible email server configurations to determine access to a source mailbox. For example, if a user provided an email address of Sally@somedomain.com, the system would try a series of possible server domain names, for example, mail.somedomain.com, pop.somedomain.com, etc. until the system finds one that works. If the system goes through the entire list of possibilities to validate an account, this can result in significant delays. Also, with the increase in "vanity" domains, using the ending of the email address might not lead to the actual server where the account is hosted. In addition, certain email actually resolves to other service provider email systems, e.g., a Verizon.com addresses resolved to mail.yahoo.com. Thus, such approaches may not always find the appropriate address of the mail server, and the user may have to wait a significant time while this process takes place only to have the process fail in the end.

United States Patent Application 2007/0073818 to Gardner et al. (which is assigned to the present Assignee) entitled "System and method for provisioning an email account using mail exchange records" discloses a system that provisions an electronic mail (email) account of a user for allowing access to an electronic mailbox from a remote device to retrieve email. A communications module receives email address parameters of the user and transmits a domain name system (DNS) query to the Internet for returning mail exchange (MX) records corresponding to the email address parameters of the user. A configuration module processes any returned MX records as a starting point for determining configuration parameters for accessing the email account of the user to retrieve user email.

Also, United States Patent Application 2007/0073819 to Gardner et al. (which is also assigned to the present Assignee) entitled "System and method for provisioning an email account using mail exchange and address records" teaches the use of a system for provisioning an electronic mail (email) account of a user for allowing access to an electronic mailbox from a remote device to retrieve email. A communications module receives email address parameters entered by the user and transmits a domain name system (DNS) query to the Internet for returning mail exchange (MX) and address (A) records corresponding to the entered email address parameters of the user. A configuration module processes any returned MX and A records to determine whether the email address parameters entered by the user are valid before attempting to provision the email account of the user.

BRIEF DESCRIPTION OF THE DRAWINGS

Other features of the present disclosure will become apparent from the detailed description which follows, when considered in light of the accompanying drawings in which.

DETAILED DESCRIPTION

Figure 1:
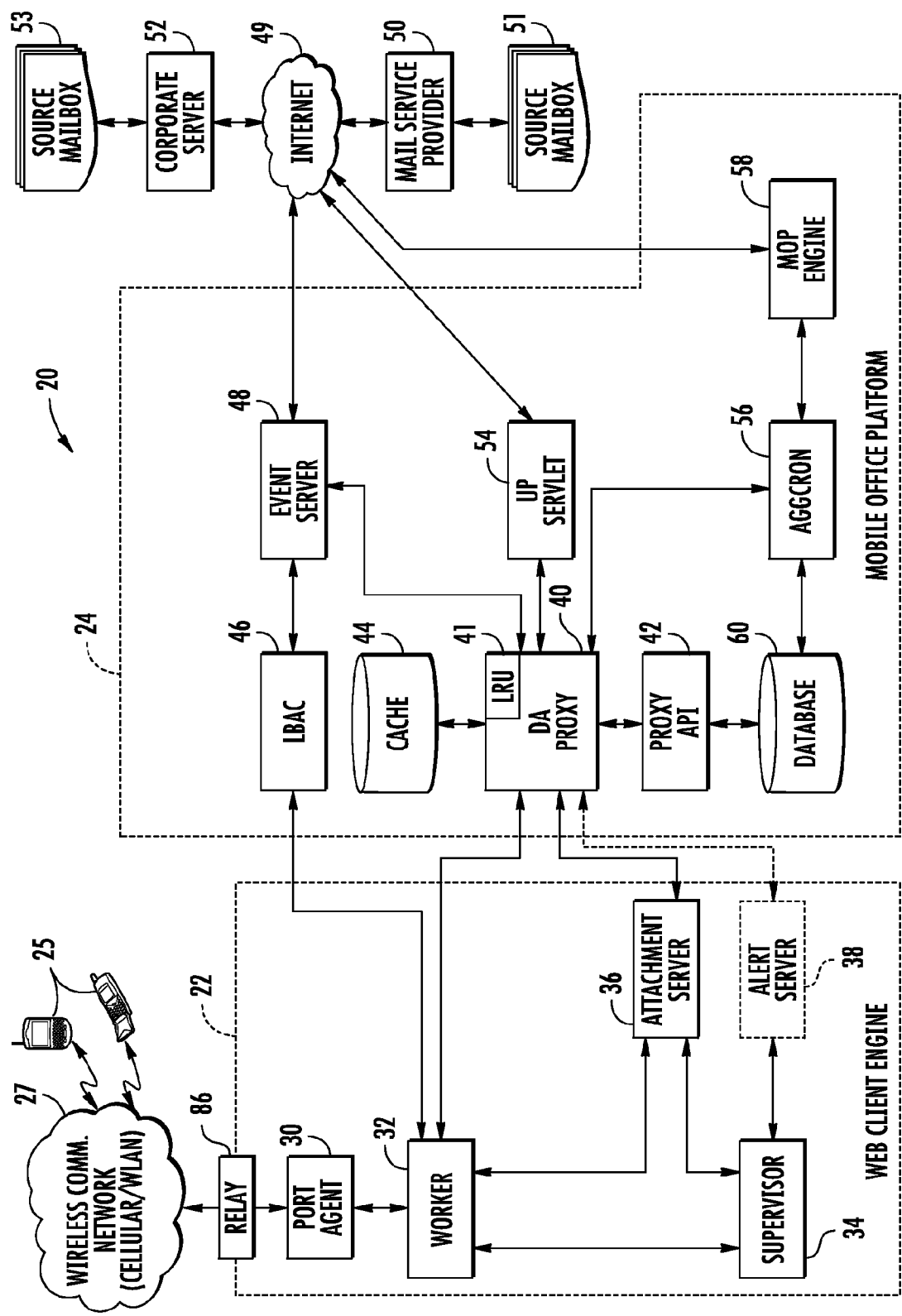
FIG. 1 is schematic block diagram of a direct access electronic mail (email) distribution and synchronization system.

The present disclosure will now be described more fully hereinafter with reference to the accompanying drawings, in which example embodiments are shown. The present disclosure may, however, be embodied in many different forms and should not be construed as limited to the example embodiments set forth herein. Rather, these example embodiments are provided so that this disclosure will be thorough and complete, and will fully convey the scope of the present disclosure to those skilled in the art. Like numbers refer to like elements throughout.

Features in accordance with the example embodiments may be provided by a system for provisioning an electronic mail (email) account of a user for allowing access to an electronic mailbox from a wireless communication device to retrieve email including a mobile office platform on which a communications module and a configuration module are operative for accessing the electronic mailbox. The communications module may be configured to receive email address parameters of the user and transmit a domain name system (DNS) query to the Internet for returning mail exchange (MX) records, including email domain names, corresponding to the email address parameters of the user. Also, the configuration module may be configured to process returned MX records to determine candidate configuration parameters for accessing the email account of the user to retrieve user email, and the configuration module may be configured to determine candidate configuration parameters based upon expanding a plurality of prioritized email domain names of the returned MX records.

The prioritized email domain names may include multiple parts respectively defining at least a user ID, email protocol and email server name pattern, and the configuration module may be configured to determine candidate configuration parameters by expanding the multiple parts of the plurality of prioritized email domain names of the returned MX records. The configuration module may be configured to attempt access to the email account of the user based upon the determined candidate configuration parameters. The configuration module may be configured to attempt access to the email account of the user based upon five or less candidate configuration parameters. The configuration module may be configured to prioritize the email domain names based upon relative geographic proximity. The configuration module may be configured to update heuristics used for determining candidate configuration parameters based upon successful candidate configuration parameters.

Features in accordance with the example embodiments may be provided by a method of provisioning an electronic mail (email) account of a user for allowing access to an electronic mailbox from a wireless communication device to retrieve email, the method including receiving email address parameters of the user and transmitting a domain name system (DNS) query to the Internet for returning mail exchange (MX) records, including email domain names, corresponding to the email address parameters of the user, processing returned MX records to determine candidate configuration parameters for accessing the email account of the user to retrieve user email, and determining candidate configuration parameters based upon expanding a plurality of prioritized email domain names of the returned MX records.

Also, a computer program product including a non-transitory computer-readable medium may have a computer-readable program code embedded therein and configured to be executed to implement provisioning an electronic mail (email) account of a user for allowing access to an electronic mailbox from a remote device to retrieve email, as set forth in the described method.

Referring initially to FIG. 1, a direct access (DA) email distribution and synchronization system 20 allows direct access to different mail sources, allowing messages to be transferred directly to a mobile wireless communication device from a source mailbox. As a result, different mail stores need not be used for integrated external source mail accounts, and a permanent copy of an email in a local email store is not required.

Although this diagram depicts objects as functionally separate, such depiction is merely for illustrative purposes. It will be apparent to those skilled in the art that the objects portrayed in this figure can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by one or more networks.

The direct access system 20 enables email users or subscribers to have email from third party email services pushed to various mobile wireless communications devices 25. Users need not create a handheld email account to gain direct access to an existing external email account. The direct access system 20 may operate without performing aggregation as used in some prior art systems, in which emails are aggregated from multiple different source mailboxes to a single target mailbox. In other words, email need not be stored in an intermediate target mailbox, but instead may usefully be accessed directly from a source mail store.

As illustrated in FIG. 1, the direct access system 20 illustratively includes a Web client (WC) engine 22 and a mobile office platform (MOP) 24. These Web client engine 22 and mobile office platform 24 operate together to provide users with direct access to their email from mobile wireless communications devices (also referred to herein as a device, remote device, wireless communication device, handheld or handheld device) 25 via one or more wireless communications networks 27, for example. Both the Web client engine 22 and the mobile office platform 24 may be located at the same location or at separate locations, and implemented in one or more servers. The web client engine 22 illustratively includes a port agent 30 for communicating with the wireless communications devices 25 via the wireless communications network(s) 27, a worker 32, a supervisor 34, and an attachment server 36, which will be discussed further below. An alert server 38 is shown in dashed lines, and in one example embodiment, is not used, but could be part of the system in yet other example embodiments.

The mobile office platform 24 illustratively includes a DA proxy 40, and a proxy application programming interface (API) 42 and a cache 44 cooperating with the DA proxy. The mobile office platform 24 also illustratively includes a load balance and cache (LBAC) module 46, an event server 48, a universal proxy (UP) Serylet 54, an AggCron module 56, a mobile office platform (MOP) engine 58, and a database (DB) engine 60, which will be discussed in further detail below. The Least Recently Used (LRU) cache 41 caches new messages, and can release messages and objects that were least recently used.

The supervisor 34 processes new mail notifications that it receives from the direct access proxy 40. It then assigns a job, in the form of a User Datagram Protocol (UDP) packet, to the least-loaded worker 32, according to the most recent UDP heartbeat the supervisor 34 has received. For purposes of this description, heartbeat is a tool that monitors the state of the server. Additionally, the supervisor 34 will receive a new service book request from the direct access proxy 40 to send service books to the mobile wireless communication device for new or changed accounts. A service book can be a class that could contain all service records currently defined. This class can be used to maintain a collection of information about the device, such as connection information or services, such as an email address of the account.

The worker 32 is an intermediary processing agent between the supervisor 34 and the port agent 30, and responsible for most processing in the Web client engine 22. It will retrieve e-mail from a universal proxy 54, via a direct access proxy, and format e-mail in Compressed Multipurpose Internet Mail Extension (CMIME) as a type of Multipurpose Internet Mail Extension, and send it to the port agent 30, for further processing. Its responsibilities include the following tasks: (1) messages sent to and received from the handheld; (2) message reply, forward and more requests; (3) Over The Air Folder Management operation (OTAFM); (4) attachment viewing; and (5) service book.

The port agent 30 acts as a transport layer between the infrastructure and the rest of the Web client engine 22. It is responsible for delivering packets to and from the mobile wireless communications device. To support different integrated mailboxes with one device, more than one service book can be used, and each service book can be associated with one integrated mailbox. A port agent 30 can include one Server Relay Protocol (SRP) connection to a relay, but it can also handle multiple SRP connections, and each connection may have a unique Globally Unique Identifier (GUID) associated with a service book. The attachment server 36 provides service for document/attachment conversion requests from workers 32.

The direct access proxy 40 provides a Web-based Distributed Authoring and Versioning (WebDAV) interface that is used by the worker 32 to access account and mailbox information. This provides functionality to create, change and move documents on a remote server, e.g., a Web server. The direct access proxy 40 typically will present an asynchronous interface to its clients. The LBAC module 46 is used by a notification server and the Web client engine 22 components to locate the proper DA proxy for the handling of a request. The universal proxy Servlet 54 abstracts access to disparate mail stores into a common protocol. The event server 48 responds to notifications of new messages from corporate servers 52 and/or mail service providers 50, which may be received via the Internet 40, for example. The notifications are communicated to the direct access proxy 40 by the AggCron module 56 and the event server 48 so that it may initiate checking for new mail on source mailboxes 51, 53 of the mail service providers 50 and/or corporate servers 52. The proxy API can be a Simple Object Access Protocol (SOAP) Daemon 42 and is the primary interface into a database 60, which is the primary data store for the mobile office platform 24. The AggCron module 56 may also periodically initiate polling for new messages as well.

The example embodiments as described usefully set forth a system and method in which the system can send a domain name system (DNS) query to the Internet upon receipt of a user email that contains email address parameters entered by the user. In one example embodiment, MX records corresponding to the email address parameters of the user can be returned, which are used as a starting point for determining configuration parameters for accessing the email account of the user and retrieving user email. In prior approaches, a system may run through a series of possible email server configurations to determine access to a source mailbox. For example, if a user provided an email address of Sally@somedomain.com, the system would try a series of possible server domain names, for example, mail.somedomain.com, pop.somedomain.com, etc. until the system finds one that works. If the system goes through the entire list of possibilities to validate an account, this can result in significant delays. Also, with the increase in "vanity" domains, using the ending of the email address might not lead to the actual server where the account is hosted. In addition, certain email actually resolves to other service provider email systems, e.g., a Verizon.com addresses resolved to mail.yahoo.com. Thus, the current approach may not always find the appropriate address of the mail server, and the user may have to wait a significant time while this process takes place only to have the process fail in the end.

The MX records can be used as a starting point for determining configuration parameters for accessing a user email account. The MX records can also be used to aid in the "guessing" logic, which is described later. A user domain name can be checked against the MX record list to see if there is a match, and if not, then the system declares a failure without trying to authenticate.

In one non-limiting example embodiment, when provisioning a new email account, the mail exchange (MX) and address (A) records corresponding to the entered email address parameters of the user are returned. A configuration module processes MX or A records to determine whether any email address parameters entered by the user are valid before attempting to provision the email account of the user. The email address parameters could be an email address, or email address and password as non-limiting examples.

Figure 2:
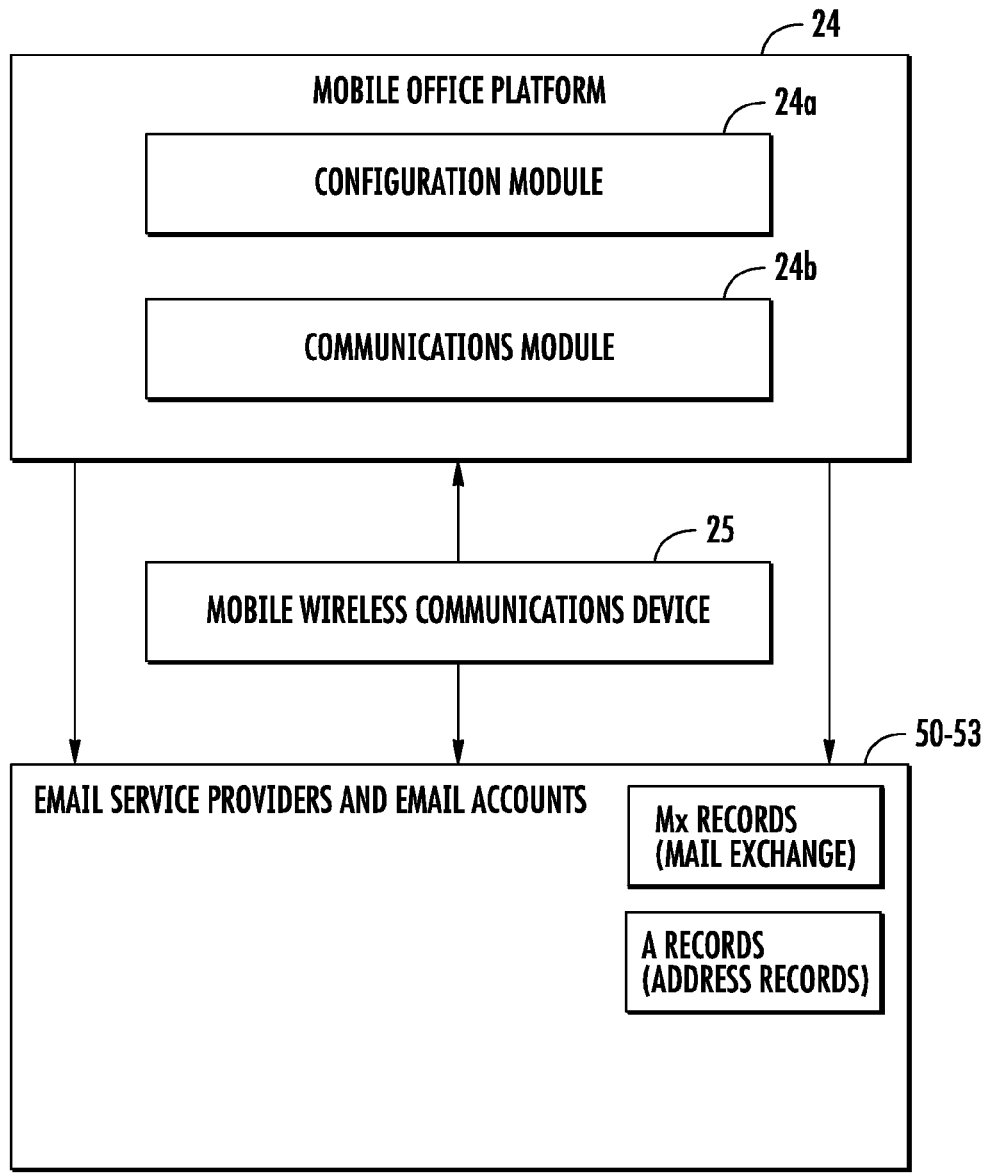
FIG. 2 is a block diagram showing functional components of a configuration module and communications module that can be operative as part of a mobile office platform.

FIG. 2 shows basic components of the mobile office platform 24 that includes functional components of a configuration module 24a and communications module 24b, and operative with the email service providers 50 having email accounts and MX records and A records. A mobile wireless communications device 25 is operative with mobile office platform 24 and email service provider 50 with email accounts. The configuration module 24a and communications module 24b are operative components with general functional and descriptive names for one or more components as described before relative to FIG. 1.

A mail exchange (MX) record can be an entry in a domain name database that identifies a mail server that is responsible for handling electronic mail for the domain name. Different MX records can be entered for any single domain name that is using more than one mail server. Priority can be obtained by a preference number, indicating the order in which the mail servers could be used. This would allow primary and back-up mail servers. Thus, an MX record maps a domain name to a list of mail exchange servers for that domain.

Another type of mapping from a name to an IP address is an address (A) record, for example, the host name to an IP address mapping. Typically, in the priority of MX records, the smallest preference number has the highest priority.

It should be understood that although the DNS system supports different types of record systems, the A record is typically a straight mapping between a name and one or more IP addresses. The MX record is usually used for routing email traffic, for example, routing emails of a particular domain name to a particular server that can be different from what is in the A records. Typically, the MX record is a good indicator for where the email domain name server is routing mail and can be used not only to check a user domain name against the MX record to see if a match occurs, but also to improve the guessing logic as will be explained below. If the MX record does not match, there could be a failure and the system may not try to authenticate, but would ask a user to re-enter the particular email address parameters. The system and method could take a portion after the "@" and do a DNS query on the internet for MX and A records. A number of MX records can be pulled and the best one is picked to accomplish the provisioning and determine which server to pull mail from, especially when a company has several servers with different MX records acting as back-ups. This is important for vanity domain names. If there is an A record, there may or may not be additional insight on provisioning, yet in some instances, the A record can be used for determining a valid address. It is also possible to make several educated guesses as explained below. Otherwise, the user is told it is not a valid address.

Figure 3:
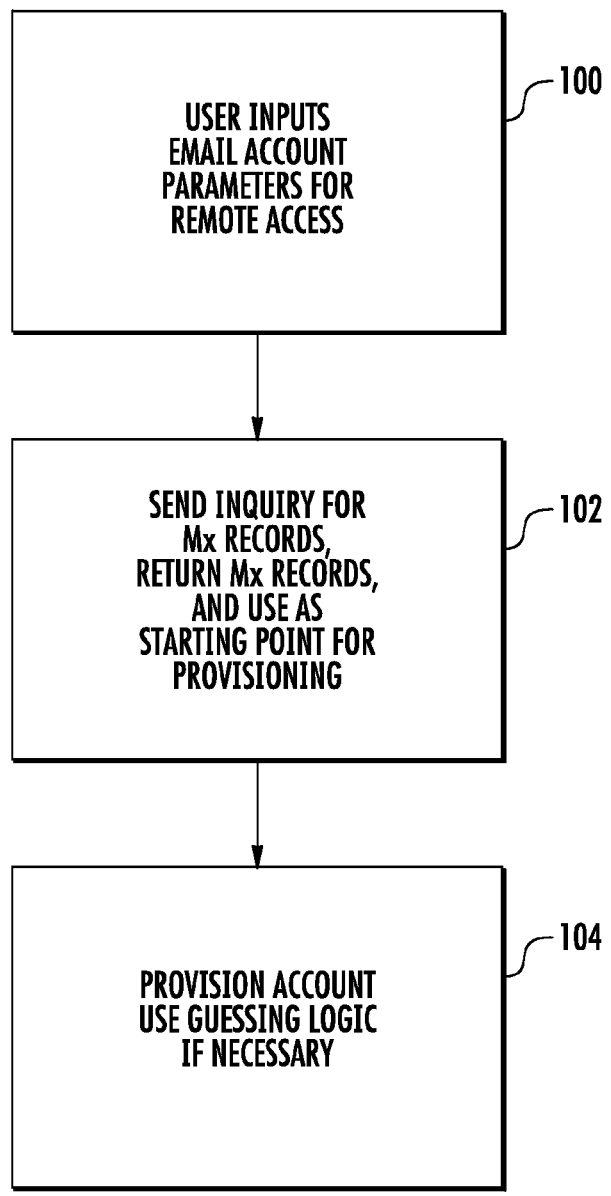
FIG. 3 is a high-level flowchart as an example of the process used for provisioning an email account using MX records.

FIG. 3 is a high-level flowchart illustrating an example of a method used for provisioning an electronic mail (email) account of a user for allowing access to an electronic mailbox from a remote device to retrieve email. The method uses MX records as a starting point for determining configuration parameters and accessing the email account of the user to retrieve user email.

As shown at block 100, a user inputs email address parameters during a provisioning process for typical remote access capabilities as described above. Upon receipt of the email address parameters, such as an email address and log-in password, the communications module transmits a DNS query to the internet for returning MX records corresponding to the email address parameters of the user. The MX records are returned and used as a starting point for determining configuration parameters for accessing the email account of the user to retrieve user email (block 102). If MX records or A records are returned for the user domain, a failure could occur and provisioning may not continue. The MX records can also be used with guessing logic, if necessary or desired (block 104).

It should be understood that in one example embodiment of an example and illustrated embodiment, there are two steps. In a first step, the user domain is used to retrieve a list of MX records. If a list of MX records comes back empty, then the user domain is used to retrieve a list of A ("address") records as a second step. If the list of A records for the domain is also empty, the system could declare a failure without trying to authenticate. A database could include a table having a row for each ISP, operative with the guessing and other logic explained below.

Typically, the configuration module 24a is operative for determining from the MX records a mail exchange server for an email domain name to which email is routed for the user email account. A prioritized list of possible mail servers can be obtained from the MX records to which the user email account is to be accessed and access to an email account can be based on priority. Configuration parameters could include the mail host, port, log-in name or password.

The configuration module 24a is operative for generating a subset of possible configuration parameters by using heuristics of likelihood that a set of configuration parameters would be valid for accessing an electronic mailbox. A database can contain relevant configuration conventions that are sets of email expressions formed by symbols that symbolically represent the conventions used by email service providers for a set of configuration parameters. The configuration module can be operative for generating sets of possible configuration parameters that can be tried for accessing an electronic mailbox of a user.

Figure 4:
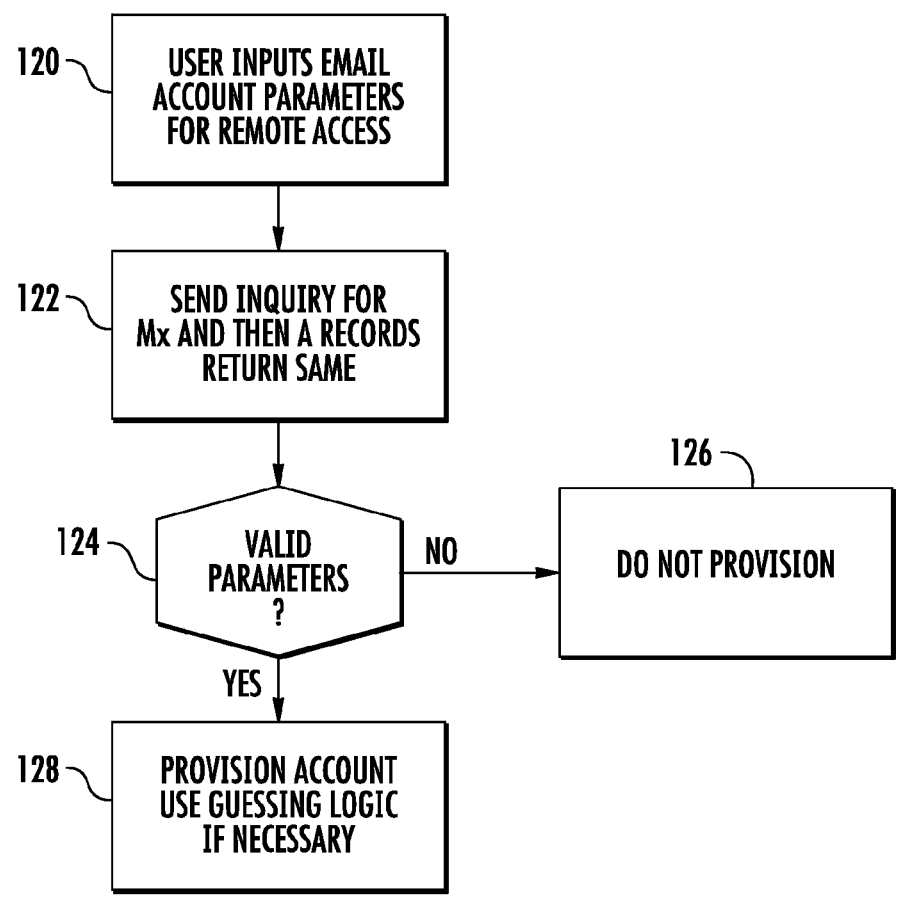
FIG. 4 is a high-level flowchart showing an example of the method used for provisioning an email account using mail exchange (MX) and address (A) records.

FIG. 4 is a high-level flowchart as an example of a method used when both MX and A records can be returned. As shown at block 120, the user inputs email address parameters to begin the method of provisioning the email account for remote access. The system 24 sends an inquiry first for MX records, and if no confirmation that the email address parameters are valid, the A records can be checked (block 122). Although this description will proceed relative to first receiving MX records, both MX and A records could be returned at the same time. A check is made for valid email address parameters (block 124). If not valid, the provisioning method stops (block 126). If these are valid email address parameters, provisioning continues and guessing logic can be used (block 128).

Typically, the configuration module 24a will process any returned MX or A records to determine whether any email address parameters entered by the user are valid before attempting to provision the email account of the user.

The configuration module 24a is operative for determining that if no MX or A records exist, email cannot be delivered or retrieved from the email account based on the entered email address parameters. Typically the configuration module can inform the user that incorrect data has been entered and provisioning of the email account cannot begin until correct email address parameters are entered. Similarly with the MX record example set forth above, a different mail exchange server can be determined and a prioritized list of possible mail servers obtained. There now follows details of an example of guessing logic that can be used.

Figure 5:
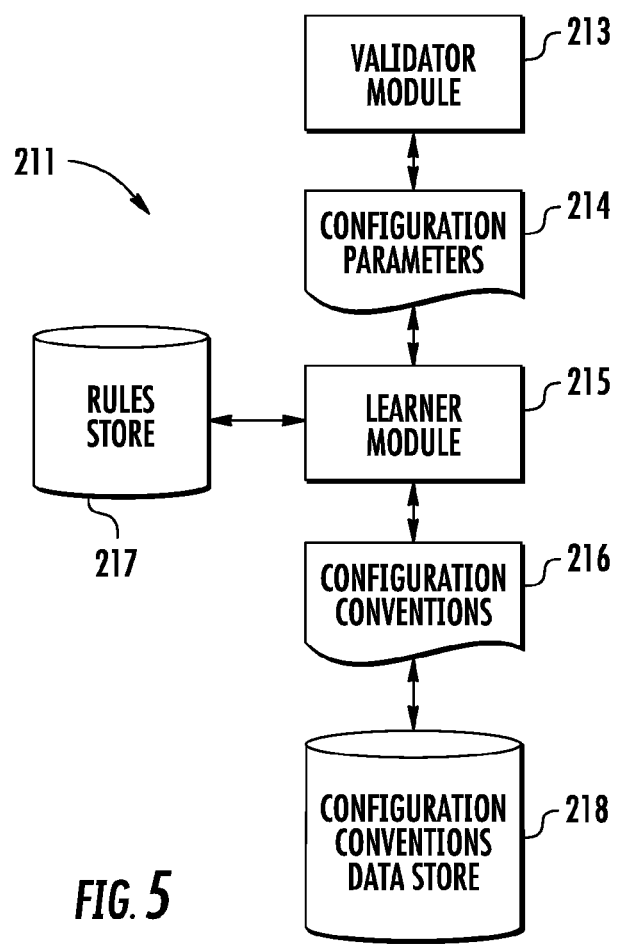
FIG. 5 is a block diagram of a system for learning mailbox configuration conventions.

Guessing logic as will be described can be used as an aid for provisioning an account. FIG. 5 illustrates a system for automatically learning conventions used by mail domains. The system is part of the intelligent server 211, which includes a validator module 213 that determines a valid set of configuration parameters 214. The server includes a learner module 215, which accepts the valid set of configuration parameters 214 and generates configuration conventions 216. A configuration conventions store 218 is operative as a database preferably part of the server, but could be separate. It stores the conventions for each mail domain. The learner module 215 is operative with a rules store 217 as a database of different rules.

The validator module 213 determines a valid set of configuration parameters 214 for a respective mailbox based on a limited number of configuration parameters provided by the user. In an example embodiment, the validator module 213 may try to access the respective mailbox using a set of best guesses (estimates) for the configuration parameters as provided by the service that invokes the validator module 213. In the example embodiment, if the access attempt fails, the validator module 213 may request additional information from the user until the validator module 213 has a valid set of configuration parameters. The validator module 213 accesses the mailbox being configured by using the access protocol relevant to the mailbox.

In an example embodiment, the validator module 213 would use POP (or other e-mail protocol) to access a POP (or other e-mail protocol) enabled mailbox to verify that the configuration parameters 214 are valid. In other example embodiments, the validator module 213 may use IMAP to access IMAP enabled mailboxes. As is obvious to those skilled in the art, there are many access protocols that may be used to access mailboxes. After attempting to validate the configuration parameters 214, the validator module 213 returns status information and the valid set of configuration parameters 214.

The learner module 215 accepts the configuration parameters 214 and generates the configuration convention 216 for the configuration parameters 214. The configuration convention 216 is a manner of formatting the conventions used for configuration parameters for storage in the configuration convention store 218. In an example embodiment, if the users email address is "john.smith@foo.com", and the login name parameter required by the relevant mail host is "jsmi", an expression within the configuration convention 216 for the login name parameter may be <FirstName(1)><LastName(3)>.

A variety of formats could be used in implementing a configuration convention 216. The learner module 215 may apply certain tests to the configuration parameters 214 to ensure that the configuration parameters 214 are credible. In an example embodiment, the learner module 215 will only learn conventions in cases where the mail host is in the same mail domain as the email address of the user, to avoid attempts by "hackers" to pollute the learned configuration conventions 216. Other tests are envisioned to ensure the integrity of the learned configuration conventions 216. The learner module 215 may also apply rules that are stored in the rules store 217. These rules may be based on business criteria or other relevant criteria. In an example embodiment, the rules may indicate that certain conventions are not to be learned for security reasons.

Configuration conventions 216 that are deemed acceptable by the learner module 215 are then stored in the configuration conventions store 218. In an example embodiment, the configuration conventions store 218 may include standard configuration conventions applicable to all domains, as well as one or more of the automatically learned configuration conventions 216 for each mail domain. Mail domains may have more than one associated configuration convention, as there may be multiple ways and protocols in which the mailbox on the mail domain may be accessed.

Services may then access the configuration conventions 216 from the configuration convention store 218 to generate a list of potential sets of configuration parameters when configuring access to one or more of the user mailboxes.

Based on empirical evidence, the vast majority of email providers adhere to a number of conventions when it comes to the configuration parameters used to access mailboxes. Almost all of the POP mail hosts in existence today are prefixed with "mail.", "pop.", or "pop3.". It is likely that a user with an email address of "john.smith@foo.com" would be able to access their POP-enabled mailbox through the host named "mail.foo.com", "pop.foo.com" or "pop3.foo.com". These conventions can be captured in a data store and it is possible for the service that requires access to the user's mailbox to use the conventions to generate potentially valid sets of configuration parameters. The server can then attempt to determine a valid set of configuration parameters that can be used to access the user's mailbox. The set of configuration parameters for the user's mailbox can be determined when the user only provides an email address and password. The system can also successfully determine the configuration parameters in most cases. As new conventions are introduced or are discovered, they may be easily added to the data store.

Figure 6:
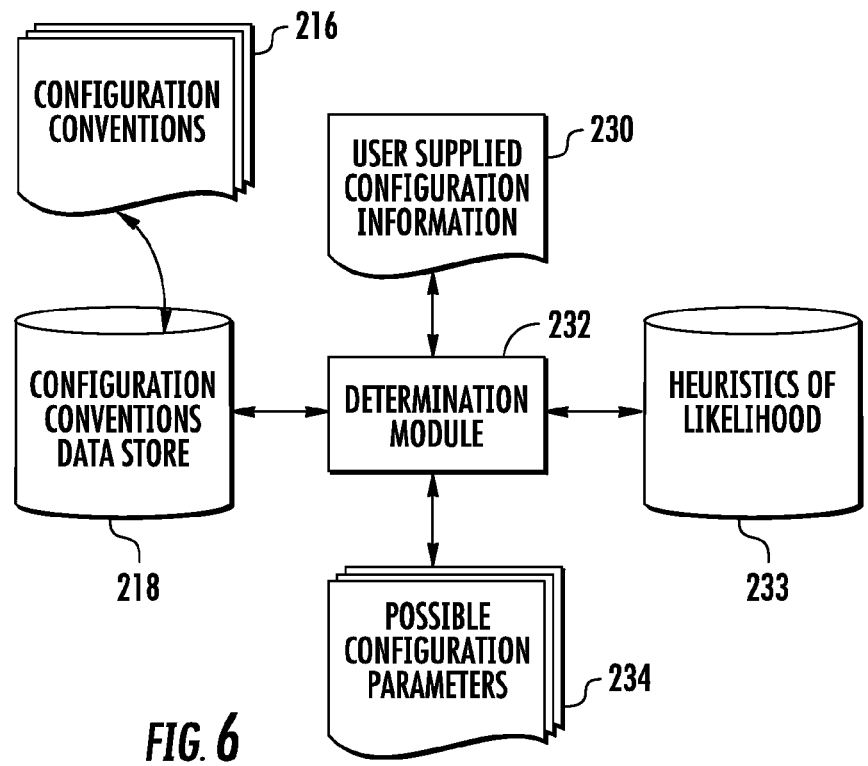
FIG. 6 is a block diagram of a system for determining configuration parameters.

A determination module 232 (FIG. 6) is part of the server 211 (FIG. 5) and operative as the mailbox interface module and generates possible sets of configuration parameters 234 based on user supplied configuration information 230, coupled with configuration conventions 216 stored in the configuration conventions data store 218. Services may then use the sets of configuration parameters 234 to determine the correct set of configuration parameters required to access the user's mailbox.

Figure 7:
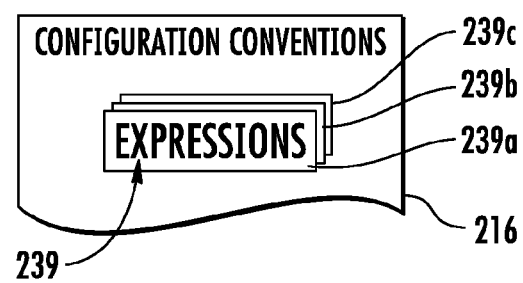
FIG. 7 is a block diagram showing details of configuration conventions using different expressions as a subset.

FIG. 7 shows further details of the configuration conventions 216. It should be understood that configuration conventions are sets of e-mail expressions formed by symbols, which can also be literals, such as a port number. In an example embodiment, a configuration convention 216 may include an expression for the server name parameter and an expression for the login name parameter. If, in the example embodiment, the email provider uses the login name "jsmith" and the mail domain "mail.foo.com" given an email address "john.smith@foo.com", the login name expression in the configuration convention 216 may be <FirstName(1)><LastName>, while the server name expression may be "mail.<MailDomain>". In this example, the number in brackets within the expression <FirstName(1)>, represents the number of characters to be used from the parameter <FirstName>, i.e. "j". As is obvious to one skilled in the art, a variety of different symbolic representations may be used to represent the conventions for configuration parameters. The configuration conventions data store 218 stores the configuration conventions 216. As new conventions are introduced or discovered, they may be easily added to the configuration conventions store 218.

The determination module 232 generates the sets of possible configuration parameters 234 based on user-supplied information 230, and relevant configuration conventions 216 from the configuration conventions data store 218. In many cases, the users email address provides sufficient information to be able to generate an accurate set of configuration parameters. In the example embodiment, given the email address "jane.doe@foo.com", the determination module 232 would use the configuration conventions 216 to generate the possible configuration parameters 234 "jdoe" for the login name, and "mail.foo.com" for the server name.

Email providers use many conventions when determining configuration parameters, and as a result, the determination module 232 generates many sets of possible configuration parameters 234. To reduce the number of sets generated, the determination module 232 may only generate a subset of the sets of possible configuration parameters 234 based on additional user information, or based on heuristics of likelihood 233 that a given set of configuration parameters 234 may be successful under a given scenario. In an example embodiment, the user may indicate that only configuration conventions 216 with a protocol expression 239 of "IMAP" should be considered. In the example, the heuristics 233 could include tracking statistics about the number of attempts and percentage of successes using a given configuration convention 216, and thereby only generate possible configuration parameters 234 based on this configuration convention 216 if certain conditions are met.

Although many email providers adhere to fairly standard conventions for configuration parameters, such as naming the mail host "mail.<MailDomain>" and matching the login name to the email address, there are many other email providers that employ less obvious conventions, such as setting the login name to be <FirstName(1)><LastName(3)>, which in the case of the user with e-mail address of "john.smith@foo.com" would translate to the login name of "jsmi". In the case of protocols that use uniform resource locators (URL) to indicate the location of the mailbox, the conventions are even less standard, since the login names are often embedded in the middle of the URL.

By capturing these conventions in the data store, it is possible for the service that requires access to the user's mailbox to use the conventions to generate potentially valid sets of configuration parameters, and then attempt to determine a valid set of configuration parameters that can be used to access the user's mailbox. Therefore, it is possible to determine the set of configuration parameters for the user's mailbox even if the user is unable to provide all of the necessary configuration information. All that may be required from the user is an email address and password, from which the system may be able to successfully determine the configuration parameters in most cases. As new conventions are introduced or are discovered, they may be easily added to the data store.

The configuration parameters could be represented using symbolic expressions, which may then be retained in the configuration conventions data store 218 for use by the service. This allows the service to draw configuration conventions from the data store, and using context data, to construct a valid set of configuration parameters that can be used to access mailboxes.

Figure 8:
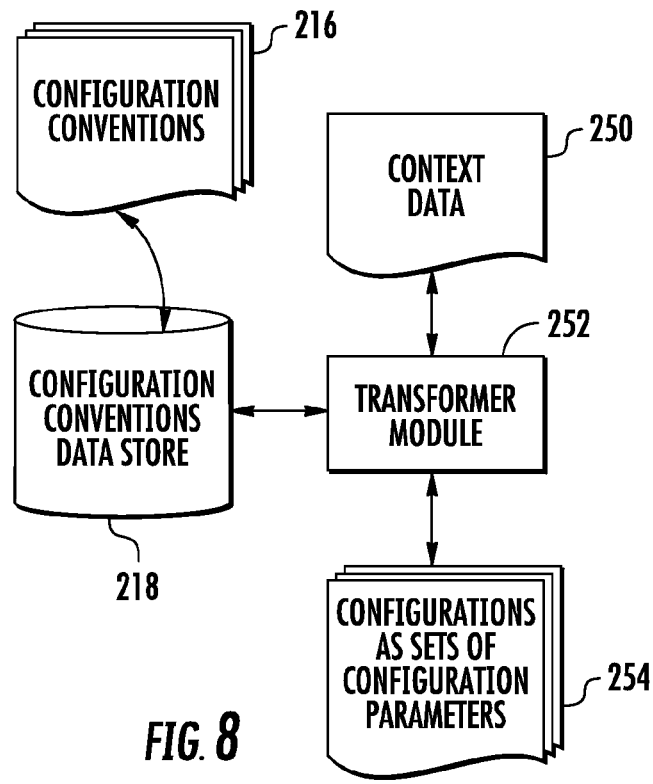
FIG. 8 is a block diagram illustrating a system for using symbolic expressions to represent conventions used for mailbox configuration parameters.

FIG. 8 illustrates an example of a system for generating configurations that include sets of configuration parameters 254. A transformer module 252 as part of server 211 (FIG. 5) takes configuration conventions 216 stored in a configuration conventions data store 218 and expands them to generate configuration parameters 254 based on user supplied context data 250.

Figure 9:
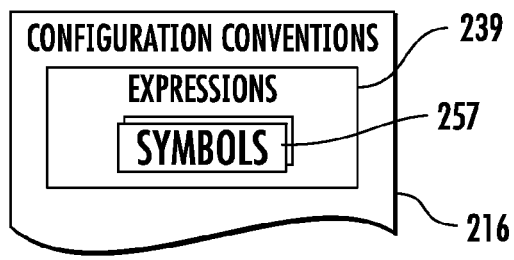
FIG. 9 is a block diagram showing an example of a representation for configuration conventions that are sets of email expressions formed by symbols.

FIG. 9 shows further details of the symbolic representation of configuration conventions 216. The configuration conventions 216 symbolically represent the conventions used by email providers for a set of configuration parameters. The configuration conventions 216 include expressions 239 that represent individual configuration parameters using symbols 257. In an example embodiment, the configuration convention 216 may be formed as an expression for the server name parameter, an expression for the login name parameter, and an expression for the mail protocol. If, in the example embodiment, the email provider uses the login name "jsmi" and the mail domain "mail.foo.com" given an email address "john.smith@foo.com", the login name expression in the configuration convention 216 may be "<FirstName(1)><LastName(3)>", while the server name expression may be "mail.<MailDomain>". In this example, the number in brackets within the symbol 257 "<FirstName(1)>", represents the number of characters to be used from the users first name parameter, i.e., "j". Similarly, the number in brackets in a symbol 257 "<LastName(3)>" represents the number of characters to be used from the users last name, i.e. "smi". As is obvious to one skilled in the art, a variety of different symbolic representations may be used to represent the conventions for configuration parameters. The choice of expressions 239 can be quite arbitrary, and are only limited by the requirement that the expression 239 can be expanded into a configuration parameter based on the context data 250 supplied to the transformer module 252.

The configuration conventions data store 218 stores the configuration conventions 216. As new conventions are introduced or discovered, they may be easily added to the configuration conventions data store 218.

The transformer module 252 expands the individual expressions 239 into configuration parameters by expanding each symbol 257 into its corresponding value using context data 250. In an example embodiment, a configuration convention 216 may include the mail protocol expression 239a, "POP", the server name expression 239b "mail.<MailDomain>" and the login name expression 239c "<FirstName(1)><LastName(3)>", for example, as shown in FIG. 7 for a plurality of expressions. If the transformer module 252 were provided with the context data 250 including the email address "john.smith@foo.com", the transformer module 252 would infer the mail domain as "foo.com" from the email address. It would then generate the configuration parameters 234 of "POP" for the mail protocol, "mail.foo.com" for the server name, and "jsmi" for the login name.

In integrating/setting up a user's email account with the email source, it is useful to allow the mobile office platform to do almost all of the work for the user, such that the user likely only needs to enter his/her email address and password to set up his/her account. It is useful to add to the integration methods, the use of MX (mail exchange) record mail domain information to "guess" the parameters to integrate/set up a user's email account.

Specifically, from information extracted from DNS (through a query for MX records based on the email domain), the approach is able to generate additional candidate email access configurations (mostly through an expansion of mail server names) that standard guessing of industry conventions alone would never have yielded. This is primarily relevant in the case of a mail provider that hosts various mail domains that have no apparent connection to the provider through basic naming conventions. For example, Google (which is commonly known to host gmail.com) could host a mail domain named "myemail.com". So, given an email address of "joe@myemail.com", in the absence of a data store that mapped the "myemail.com" mail domain to one or more of Google mail servers, it may be extremely difficult (if not impossible) to determine that mail access is accomplished through Google. But by querying DNS for the MX records of the "myemail.com" mail domain, the method would be made aware of Google's involvement, and could then construct high-quality "guesses" as to what the mail server name might be based on that.

When integrating/setting up a user's email account with the mobile office platform and the email source, the mobile office platform may maintain a "guessing logic" table (Guess table) of possible parameters for correctly setting up the account, as discussed above. Also, the mobile office platform may include in the Guess table, guesses derived from MX record mail domain information as possible parameters.

The discovery of the MX records is dynamic (i.e. at runtime, as opposed to a preconfigured table). In addition to the additional guesses, the approach may include a first preference mail domain from the MX record (as a result of a return by a DNS call that results in a unique guess configuration). An example first preference is the MX server value: mx1.foo.barcom. The mobile office platform may also include a second-preference mail domain from the MX record (as a result of a return by a DNS call). An example second preference is the MX server value: mx2.foo.barapple.sauce.com.

From the first and second preference server values, possible parameters may be generated, in a multi-part expansion of the server values, e.g.: pop.foo.bar.com (using mx1server server domain); pop.bar.com (using mx1 server remaining last two domain parts); pop.foo.bar.apple.sauce.com (using mx2server server domain); pop.bar.apple.sauce.com (using mx2server substring after first domain prefix); pop.apple.sauce.com (using mx2server substring after second domain prefix); pop.sauce.com (using mx2server substring after the second domain prefix).

In an example embodiment, the mobile office platform will not include more than a predetermined number (e.g. five (5)) total mail domains from the MX record (e.g. combination of first- and second-preference) as result of a return by a DNS call. In using a limitation of e.g. 5, it may be possible to find a "sweet spot" for providing a useful number of mail domains.

In an example embodiment, the relative geographic proximity of the MX DNS may be used to help determine the first and second preference email server values. In an example embodiment, once logs are obtained from using the described methods, heuristics can be updated using historical information in the logs to improve the "guessing" of possible parameters.

Figure 10:
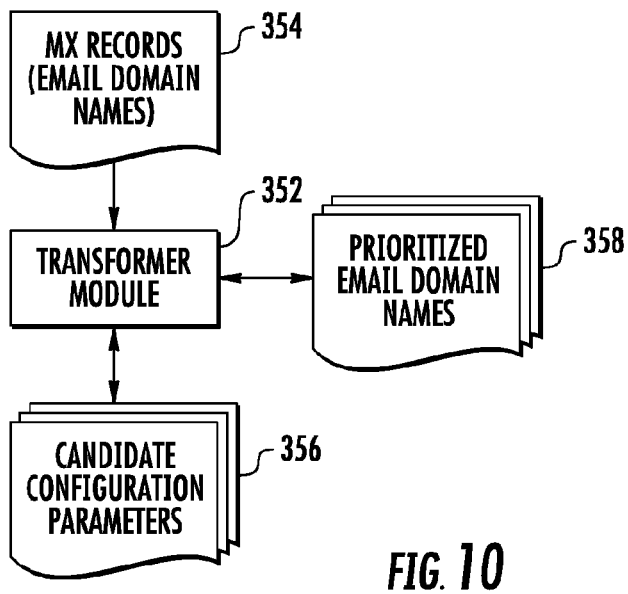
FIG. 10 is a schematic diagram illustrating an example of a system for provisioning an email account using mail exchange (MX) records and prioritized email domain names.
Figure 11:
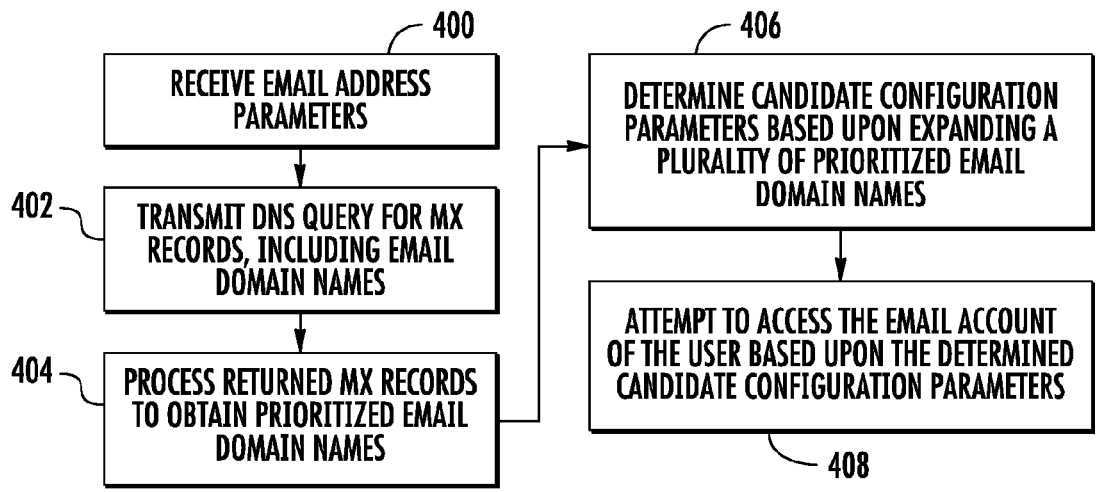
FIG. 11 is a flowchart illustrating an example of the method used for provisioning an email account using mail exchange (MX) records and prioritized email domain names.

Referring to FIGS. 2, 10 and 11, example embodiments of a system and method for provisioning an electronic mail (email) account of a user for allowing access to an electronic mailbox from a remote device to retrieve email will be described. The mobile office platform 24 includes a configuration module 24a and a communications module 24b which are operative for accessing an electronic mailbox. The communications module 24b receives email address parameters of the user and transmit a domain name system (DNS) query to the Internet for returning mail exchange (MX) records, including email domain names, corresponding to the email address parameters of the user. The configuration module 24a processes returned MX records to determine candidate configuration parameters for accessing the email account of the user to retrieve user email. The configuration module 24a determines candidate configuration parameters based upon expanding a plurality of prioritized email domain names of the returned MX records.

As illustrated in FIG. 10, a transformer module 352, which is a part of the configuration module 24a, processes returned MX records 354 to determine candidate configuration parameters 356 for accessing the email account of the user to retrieve user email. Candidate configuration parameters 356 are determined based upon expanding a plurality of prioritized email domain names 358 of the returned MX records.

A method of provisioning an electronic mail (email) account of a user for allowing access to an electronic mailbox from a remote device to retrieve email is described with reference to the flowchart in FIG. 11. The method includes (block 400) receiving email address parameters of the user and (block 402) transmitting a domain name system (DNS) query to the Internet for returning mail exchange (MX) records, including email domain names, corresponding to the email address parameters of the user. At block 404, the method includes processing returned MX records to prioritize email domain names, and at block 406, determining candidate configuration parameters based upon expanding a plurality of prioritized email domain names of the returned MX records. As discussed above, the prioritized email domain names may include multiple parts respectively defining at least a user ID, email protocol and email server name pattern, and determining candidate configuration parameters may include expanding the multiple parts of the plurality of prioritized email domain names of the returned MX records. The method also may include, (Block 408) attempting to access the email account of the user based upon the determined candidate configuration parameters.

Another example embodiment is directed to a computer program product including a non-transitory computer-readable medium having a computer-readable program code embedded therein, and configured to be executed to implement provisioning an electronic mail (email) account of a user for allowing access to an electronic mailbox from a remote device to retrieve email, as set forth in the disclosed method(s).

The described approaches are intended to make the integration method from the "Simple Integration" screen as effective as possible and therefore to help minimize the number of times a user is presented with the "Advanced Integration" screen. The advanced screen requests information from the user such as the name of the mail server, which most users won't know. This screen is almost certainly responsible for many calls to carriers' help desks. In addition to, or possibly in place of, the current set of "raw guesses" (mail domain-based Guess table rows), the approach may configure additional "guesses" (MX record-based Guess table rows) using the mail domains returned in the MX record set and attempt to achieve integration.

When the mobile office platform issues the raw guesses (mail domainbased Guess table row), the approach may also use the server domain(s) (e.g. first and second prioritized) of the MX record returned for the mail domain of the user's email address (MX recordbased Guess table row). The main use case is to allow dynamic detection of hosted domains, i.e. where the mail server is NOT a derivative of the mail domain in the user's email address. An example: user@primomoda.com hosts mail at 1and1 so the mail server name is imap.1and1.com, however when using only a raw guessing mechanism the mobile office platform may only guess mail servers that are derivatives of the mail domain in the email address like the following examples: pop.primomoda.com, imap.primomoda.com, mail.primomoda.com.

Current approaches may not ever try imap.1and1.com, however since the MX record for primomoda.com returns as mx00.1and1.com the present approach would be able to "guess" the mail server if it used the server domain from the MX record lookup.

To determine a set of patterns that will be used to attempt integration for each MX record mail server, there may be a variety of possible patterns which can be used to attempt to connect to a mail server and to validate the user's credentials. These patterns include various combinations of the user identifier (e.g., user ID in front of the "@" sign vs. the entire address), the protocol (e.g., POP, NAP), server pattern (e.g., mail pop.maildom), use or not of SSL, port, etc.

It may also be useful to determine what level of the MX record mail server domain will yield the greatest chance of achieving integration. Mail domain names are expressed as hierarchical domain levels separated by periods, with the top level on the right side and increasing levels of granularity moving left: e.g., mx1.comcast.com, smtp.embarq.synacor.com. It is possible to attempt integration at any level greater than the first level—i.e., comcast.com or mail.comcast.com, but not just .com. Not all levels will result in connection with the mail server. In order to create a reusable pattern, it may be determined at what level integration should be attempted for the majority of situations.

It may be useful to create the ability to capture first and second (if present) preference mail servers from MX record lookup, and to determine which mail domain(s) to use in case of multiple possibilities. Multiple MX records are often returned in a DNS look-up, and there may be more than one MX record with the same preference score: e.g., mx1.comcast.net and mx2.comcast.net, both with preference number of 5. The approach may determine whether to use mx1, mx2 or both.

It may also be useful to implement the use of the MX record mail server domains as part of the mailbox integration method guessing logic. This may include creating any code, variables, additional database tokens, etc. necessary to implement this example embodiment. Furthermore, the approach may implement logging of successful integrations, i.e. to be able to determine what worked or why integration failed.

An effect of the above described approaches may be to enlarge the number of possible guesses by including mail server domains from the MX record of the user's email address (i.e., add MX record-based rows to the Guess table). By adding MX record-based guesses to the mail domain-based guesses, the mobile office platform will achieve more successful integrations from the simple integration screen and less presentations of the advanced integration screen.

Figure 12:
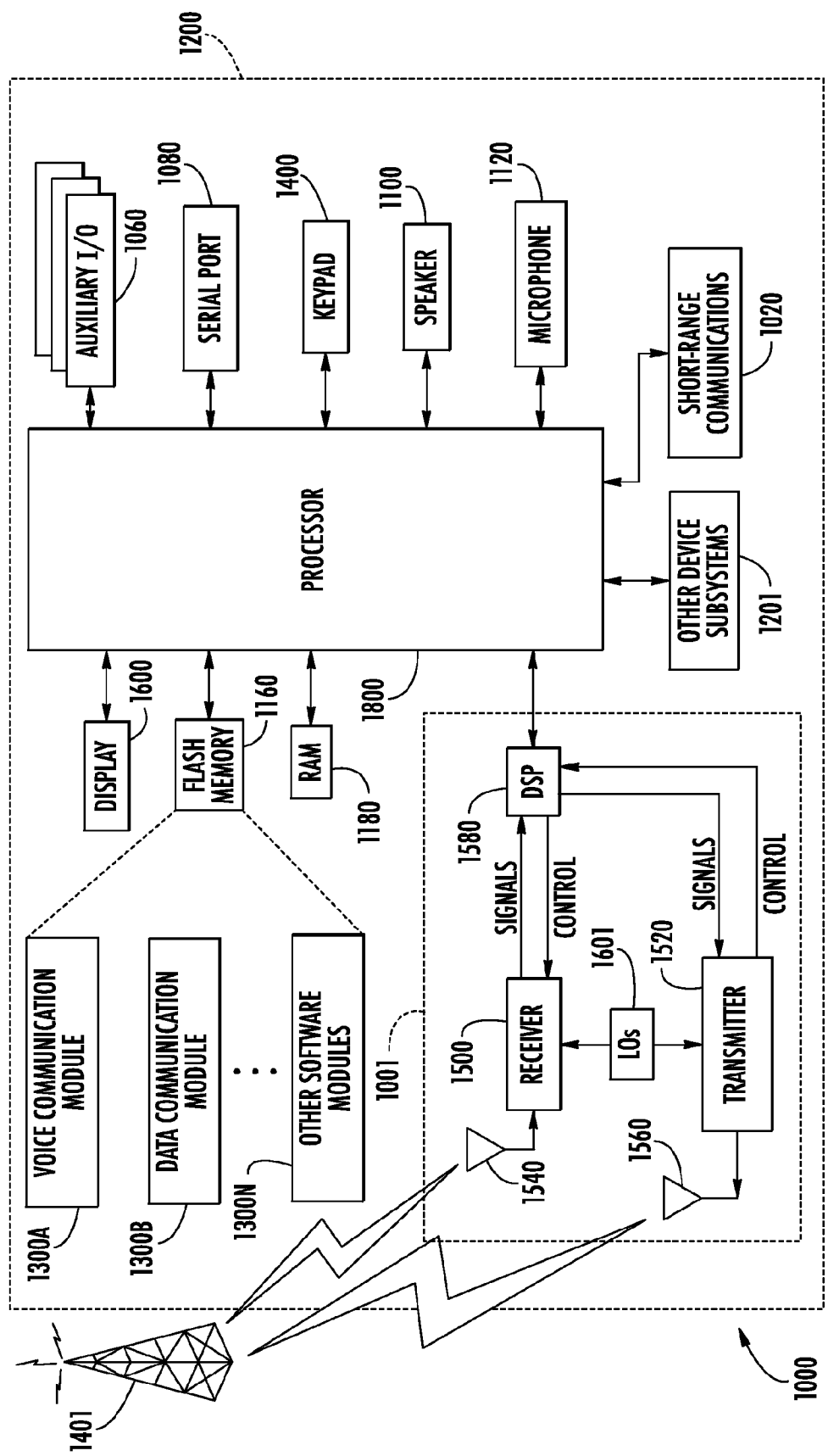
FIG. 12 is a schematic block diagram illustrating an example mobile wireless communications device that can be used with the Direct Access system shown in FIG. 1.

An example of a mobile wireless communications device 1000 that may be used in example embodiments disclosed herein (e.g. as the mobile wireless communications devices 25 of FIGS. 1 and 2) is further described in the example below with reference to FIG. 12. The device 1000 illustratively includes a housing 1200, a keypad 1400 and an output device 1600. The output device shown is a display 1600, which is preferably a full graphic LCD. Other types of output devices may alternatively be utilized. A processor 1800 is contained within the housing 1200 and is coupled between the keypad 1400 and the display 1600. The processor 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

In addition to the processor 1800, other parts of the mobile device 1000 are shown schematically in FIG. 10. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processor 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processor 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1620. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processor 1800. The received signal is then further processed by the processor 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other example embodiments of the present disclosure will come to the mind of one skilled in the art having the benefit of the teachings presented in the foregoing descriptions and the associated drawings. Therefore, it is understood that the invention is not to be limited to the specific example embodiments disclosed, and that modifications and example embodiments are intended to be included within the scope of the appended claims.

That which is claimed is:

1. A system for provisioning an electronic mail (email) account of a user for allowing access to an electronic mailbox to retrieve email comprising:
    a mobile office platform operative as an agent between the user and electronic mailbox of the user and comprising a processor and a memory and defining a communications module and a configuration module that are operative for accessing the electronic mailbox;
    the communications module configured to receive email address parameters of a user and transmit a domain name system (DNS) query to the Internet for returning mail exchange (MX) records, including email domain names, corresponding to the email address parameters of the user;
    the configuration module configured to process returned MX records to determine candidate configuration parameters for accessing the email account of the user to retrieve user email; and
    the configuration module configured to determine candidate configuration parameters based upon expanding a plurality of prioritized email domain names of the returned MX records and including a first preference mail domain and a second preference mail domain based upon relative geographic proximity.

2. A system according to claim 1, wherein access to the electronic mailbox is from a wireless communication device.

3. A system according to claim 1, wherein the prioritized email domain names include multiple parts; and the configuration module is configured to determine candidate configuration parameters by expanding the multiple parts of the plurality of prioritized email domain names of the returned MX records.

4. A system according to claim 3, wherein the multiple parts are respectively defined to comprise at least one of a user ID, email protocol and email server name pattern.

5. A system according to claim 1, wherein the configuration module is configured to attempt access to the email account of the user based upon the determined candidate configuration parameters.

6. A system according to claim 1, wherein the configuration module is configured to attempt access to the email account of the user based upon five or less candidate configuration parameters.

7. A system according to claim 1, wherein the configuration module is configured to update heuristics used for determining candidate configuration parameters based upon successful candidate configuration parameters.

8. A method of provisioning an electronic mail (email) account for allowing access to an electronic mailbox to retrieve email, the method comprising:
    receiving email address parameters of a user and transmitting a domain name system (DNS) query to the Internet for returning mail exchange (MX) records, including email domain names, corresponding to the email address parameters of the user;
    processing returned MX records to determine candidate configuration parameters for accessing the email account of the user to retrieve user email; and
    determining candidate configuration parameters based upon expanding a plurality of prioritized email domain names of the returned MX records and including a first preference mail domain and a second preference mail domain based upon relative geographic proximity.

9. A method according to claim 8, wherein access to the electronic mailbox is from a wireless communication device.

10. A method according to claim 8, wherein the prioritized email domain names include multiple parts; and determining candidate configuration parameters includes expanding the multiple parts of the plurality of prioritized email domain names of the returned MX records.

11. A method according to claim 10, wherein the multiple parts are respectively defined to comprise at least one of a user ID, email protocol and email server name pattern.

12. A method according to claim 8, further comprising attempting to access the email account of the user based upon the determined candidate configuration parameters.

13. A method according to claim 8, further comprising attempting access to the email account of the user based upon five or less candidate configuration parameters.

14. A method according to claim 8, further comprising updating heuristics used for determining candidate configuration parameters based upon successful candidate configuration parameters.

15. A computer program product comprising a non-transitory computer-readable medium having a computer-readable program code embedded therein, said computer-readable program code configured to be executed to implement provisioning an electronic mail (email) account for allowing access to an electronic mailbox to retrieve email, comprising:
    receiving email address parameters of the user and transmitting a domain name system (DNS) query to the Internet for returning mail exchange (MX) records, including email domain names, corresponding to the email address parameters of a user;
    processing returned MX records to determine candidate configuration parameters for accessing the email account of the user to retrieve user email; and
    determining candidate configuration parameters based upon expanding a plurality of prioritized email domain names of the returned MX records and including a first preference mail domain and a second preference mail domain based upon relative geographic proximity.

* * * * *